United States Patent [19]

Armstrong et al.

[11] 4,046,003
[45] Sept. 6, 1977

[54] ENGINE TURBOCHARGER DIAGNOSTICS

[75] Inventors: Lee R. Armstrong; Henry J. Mercik, Jr., both of Enfield, Conn.

[73] Assignee: United Technologies Corporation, Hartford, Conn.

[21] Appl. No.: 684,216

[22] Filed: May 7, 1976

[51] Int. Cl.² .......................................... G01M 15/00
[52] U.S. Cl. .................................................... 73/118
[58] Field of Search .................... 73/118, 116, 168; 123/119 CE

[56] References Cited

U.S. PATENT DOCUMENTS

| 2,389,281 | 11/1945 | Staley | 73/116 X |
| 3,270,724 | 9/1966 | Dolza | 123/119 C X |

Primary Examiner—Jerry W. Myracle
Attorney, Agent, or Firm—M. P. Williams

[57] ABSTRACT

The turbocharger of an internal combustion engine is diagnosed by virtue of a single pressure measurement made during an acceleration of the engine using only its accessory loading, drag and inertia as a load, instead of making a profile of pressure ratio across the turbocharger under full load conditions on a dynomometer, as in the prior art. As the engine accelerates, pressure is continuously monitored, the ratio of the rate of change of the pressure with respect to time is made, and the maximum change in pressure per unit of time recorded; the minimum pressure sensed may also be recorded as an indication of the restrictive effect of the turbocharger when not being driven to its capacity.

11 Claims, 3 Drawing Figures

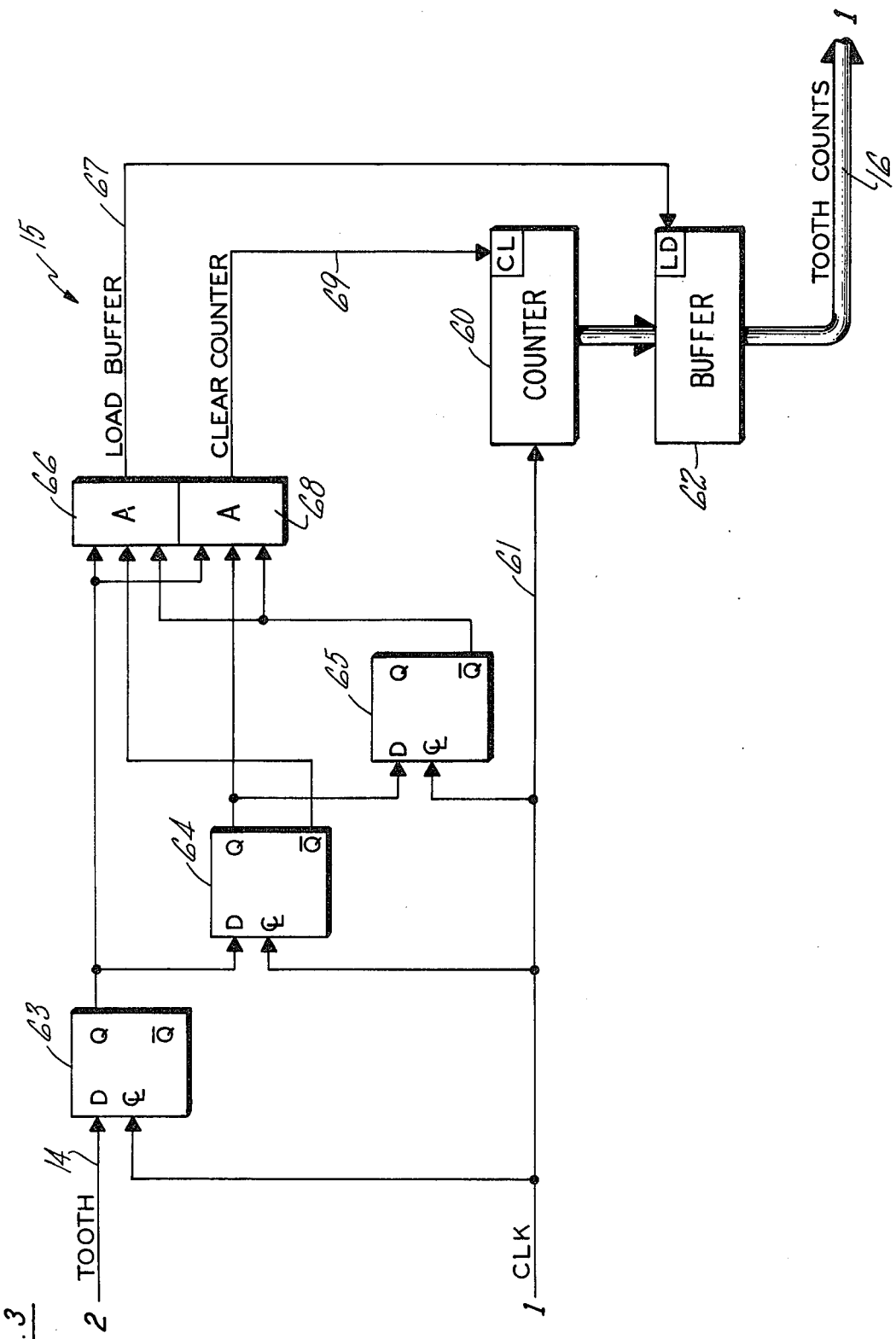

ENGINE TURBOCHARGER DIAGNOSTICS

CROSS REFERENCE TO RELATED APPLICATIONS

The subject matter herein may employ the subject matter of a commonly owned, copending application filed on even date herewith by Rackliffe et al, Ser. No. 684,220, entitled SUB-CYCLIC MEASUREMENT OF SPEED OF AN INTERNAL COMBUSTION ENGINE.

BACKGROUND OF THE INVENTION

1. Field of the Invention

This invention relates to diagnosing internal combustion engines electronically.

2. Description of the Prior Art

It is known in the prior art that the turbocharger commonly used with internal combustion engines, particularly diesel engines, is an important factor of engine health. First, it is necessary that the turbocharger deliver air under pressure to the air intake manifold of the engine in desired quantities and pressures. And, due to its location at the inlet to the engine, any tendency of the turbocharger to disintegrate into small pieces can totally wreck an engine due to ingestion of the pieces into the cylinders of the engine. Many factors, such as drag due to bent blades, warped heat shields and end play, and incipient bearing failure, will show up in turbocharger testing. In the prior art, it has been common to test a turbocharger by mapping pressure ratio across the turbocharger at various engine speeds and at various turbocharger speeds, while the engine is fully loaded, thereby delivering a maximum amount of hot exhaust gas to drive the turbine thereof, the engine being mounted in a vehicle situated on a dynomometer which provides the load to the engine. However, a dynomometer is a very expensive and cumbersome machine; further, dynomometers are frequently not available at locations where engines require testing. In such cases, no practical tests are available in the prior art.

SUMMARY OF THE INVENTION

Objects of the present invention include testing of a turbocharger on a vehicle-mounted engine without a dynomometer, and pressure testing of a turbocharger with but a single pressure sensor.

The present invention is predicated on the fact that the inertia of the turbocharger of engines of a similar type is essentially constant from one engine to the next. Since the acceleration of the turbocharger is a function of engine power, and therefore of engine speed during free acceleration of the engine as related to the inertia and drag of the turbocharger, gross variations in the acceleration of the turbocharger can be attributable to commensurate variations in drag.

The invention is further predicated in part on the concept that an engine accelerating with its own accessory loading, drag and inertia as its load, will accelerate substantially linearly; this, a measure of the rate at which a turbocharger accelerates with engine acceleration can be determined by measuring the acceleration of the turbocharger with respect to time; and, the measure of the turbocharger acceleration, in combination with its general ability to compress air at given speeds, is readily measured at a single point, by measurement of pressure at the air intake manifold.

According to the present invention, a single pressure transducer at the air inlet manifold of a vehicle is utilized to test a turbocharger mounted on an engine by accelerating the engine, and measuring a rate of change of pressure during acceleration. In accordance further with the invention, the maximum pressure increase per unit of time is determined and recorded. In still further accord with the present invention, minimum pressure at the air inlet manifold may also be measured as a function of the inlet air restriction provided by the turbocharger when not operating to its capacity.

The invention provides adequate testing of a turbocharger in that the rate at which the turbocharger builds up speed and provides increases in pressure to the air intake manifold as a function of speed of the engine is dependent upon factors such as drag, which in turn can result from incipient mechanical failure, such as blades rubbing on the casing, bearing wear and the like. Thus the lag in the turbocharger in achieving suitable pressure at a suitable speed is a measure of the health of the turbocharger, and this can be accomplished without the need of a dynomometer.

The foregoing and various other objects, features and advantages of the present invention will become more apparent in the light of the following detailed description of a preferred embodiment thereof, as illustrated in the accompanying drawing.

BRIEF DESCRIPTION OF THE DRAWING

FIG. 3 is a simplified schematic diagram of tooth timer means for obtaining instantaneous, sub-cyclic engine speed in the embodiment of FIG. 1.

DESCRIPTION OF THE PREFERRED EMBODIMENTS

Figure 1:
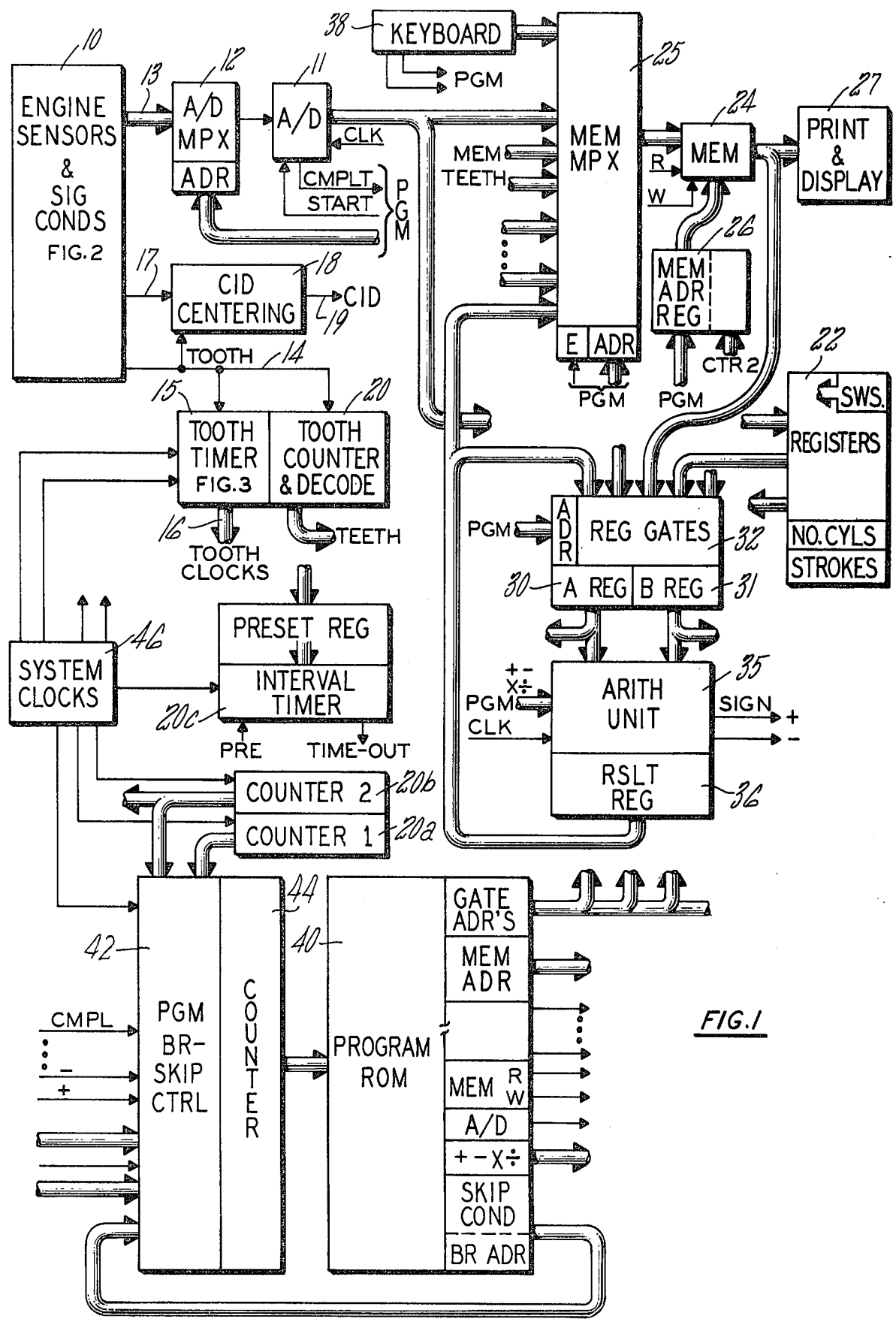
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 or a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
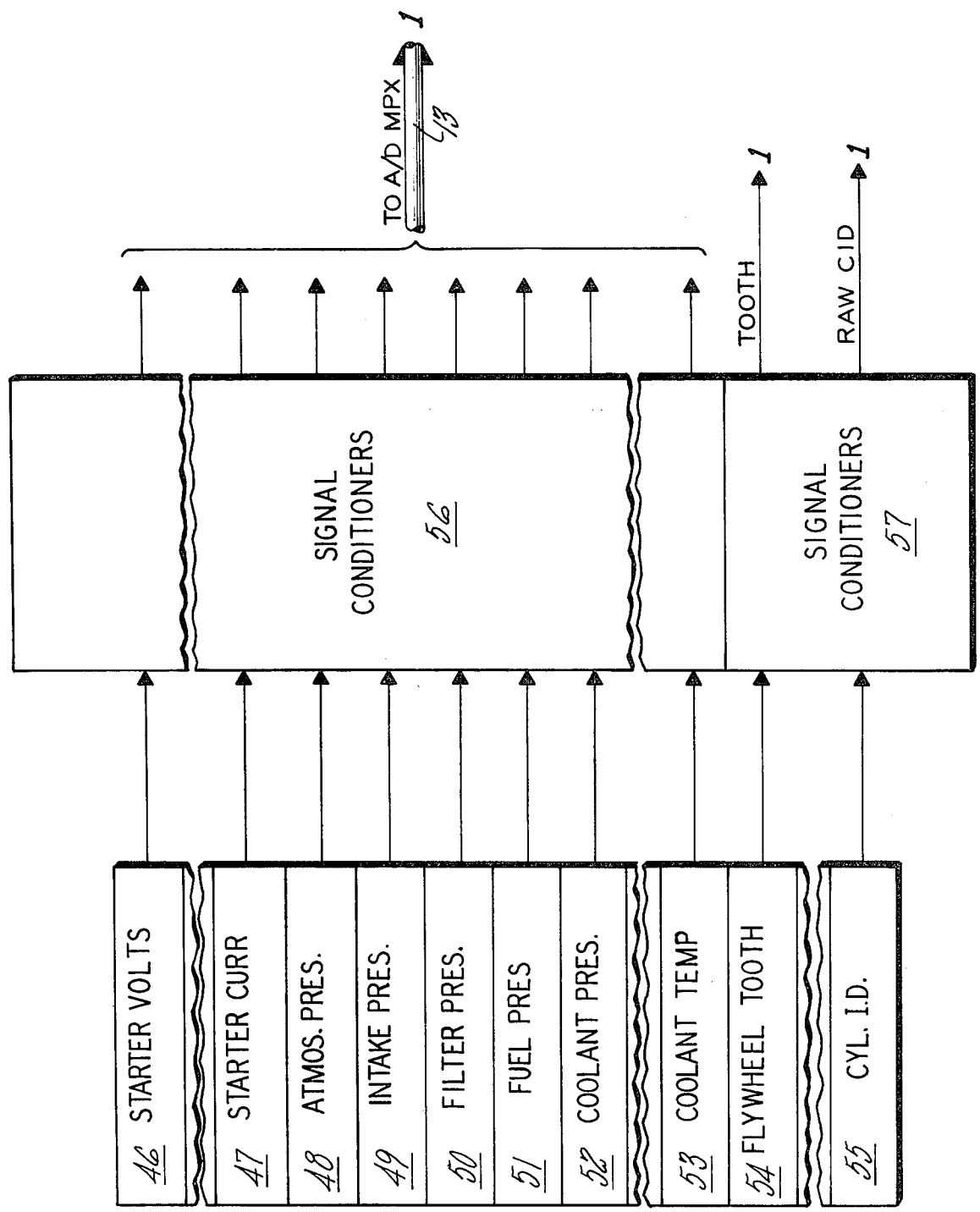
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flop 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth," a stored factor indicating the number of teeth on the flywheel of the engine under test. This may be determined and entered from engine specifications, or as set forth in a commonly owned copending application of Stick et al, Ser. No. 684,037, entitled "Determination of Number of Teeth on an Internal Combustion Engine Flywheel." Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of counter variables, such as cylinders, in a well known fashion.

The present invention measures the pressure at the air intake manifold of an engine while it is accelerating with only itself and its own accessories as a load, over discrete time intervals. Because an engine accelerates substantially linearly, the discrete time intervals will very closely approximate linear increases in speed of the engine as it accelerates. For each time that the intake pressure is measured, the rate of change of pressure is measured, and thereafter the greatest pressure difference is identified.

The tests herein include finding the maximum pressure change with respect to time. The maximum pressure change is of very great interest since it is a good overall indication not only of the speed achieved by the turbocharger, but also the usefulness of the work it is doing (obviously, a turbocharger with missing blades could get up to speed easily but would not be doing useful work). In some instances, it is possible to measure pressure change as a function of turbocharger speed or as a function of engine speed. However, measuring the change in turbocharger pressure as a function of engine speed could prove to be misleading in many instances, in that some turbochargers reach minimum pressure just before the point at which the governor cut out reduces fuel and limits the speed of the engine; thereafter the rate of pressure rise as a function of engine speed would increase in an inordinate fashion. But, if desired, in any particular implementation of the present invention, it is perfectly possible to substitute increments of speed, determined by the instantaneous, subcyclic speed measurement procedure set out in the aforementioned co-pending application of Rackliffe et al.

The present test is done during an acceleration, so the fact that an acceleration is occurring must be known. Obviously, when an operator opens the throttle of the engine to get a snap acceleration, he knows that it is accelerating; however, to reduce wasted operating time and to assure proper operation, it is preferable to start the test and wait for the operator to accelerate the engine, sensing a threshold speed that is above low idle to indicate that the acceleration is in process. Such a speed may be on the order of 900 rpm, although this is adjustable to suit any particular implementation of the present invention.

To sense a threshold speed at the beginning of the snap acceleration, the teachings of the aforementioned Rackliffe et al application may be utilized. For the easiest sensing of speed, a speed factor can first be calculated such that the counts established in the tooth timer can be compared directly therewith, and when the tooth timer counts become smaller than those indicated by the factor, the desired speed is known to have been reached. When sensing speed by tooth-to-tooth time intervals of flywheel teeth as they pass a sensor, the speed is equal to the ratio of one tooth to the total number of teeth (RGT) on the flywheel, all of which is divided by the ratio of counts during the tooth interval to the frequency of the clock driving the tooth timer. This provides speed in revolutions per second, and must be multiplied by 60 in order to indicate speed in rpm's. Simplified, the speed in rpm's is equal to 60 times the frequency of the clock all of which is divided by the number of teeth on the flywheel times the number of counts in the tooth timer. Transposing the position of speed in rpm and counts in the timer, the counts in the timer indicative of any particular speed is equal to the product of frequency of the clock times 60, all of which is divided by the desired speed in rmp's times the total number of teeth (RGT) on the flywheel. The predetermined speed factor can be determined and made ready for use in accordance with the following exemplary instructions:

1. Load MEM (Freq) to A REG
2. Load MEM (RGT) to B REG
3. Divide
4. Load RSLT to A REG
5. Load MEM (Start Spd) to B REG
6. Divide
7. Load RSLT to A REG
8. Load 60 Factor to B REG
9. Multiply
10. Load RSLT to B REG Then the system can simply monitor the tooth timer counts, continuously substracting the tooth timer counts from the predetermined counts. Since counts become smaller and smaller as the speed increases, when the speed of the engine exceeds the predetermined speed, then the predetermined counts will exceed the tooth timer counts and this can be determined by doing a reverse subtract and looking for a negative result as set forth in the following instructions:

11. Load Tooth timer to A REG
12. Subtract; Skip one if -
13. Branch to 11

In the present example, pressure readings are taken repetitively in response to elapse of a constant sampling rate time interval, which may be on the order of 50 milliseconds. This may be provided by inherent time delays in the program of the computer, or it may be provided by inherent time delay in the sampling capacity of an A/D converter used to convert the pressure measurements into digital readings; however, herein the 50 millisecond interval is provided by the interval timer 20C. Depending on the frequency of clock used to drive the interval timer, a preset factor can be determined, which is used to preset the interval timer every time that it is started. Thereafter, the remaining counts will be made in response to the frequency of the driving clock in the time interval desired, after which it will time out. In the present example, A/D conversion is provided following interval time out, but the A/D conversion time will be substantially constant from one sampling to the next, and simply provides a minor lag in the readings taken; since only a minimum pressure and maximum rate of change pressure are measured in the example herein, this lag is immaterial. During the periods of time between successive sampling of the A/D converter, the difference between the current reading and the next preceding reading is made, to provide the difference (D) between the two pressure readings, which because it is over a constant time interval, indicates the rate of pressure change per unit of time. During the interval between samplings of the A/D converter, the difference (D) taken for each reading is compared with the difference (D) for the preceding couple of readings, so that the maximum difference is also calculated on-the-fly. However, the first reading has nothing to be subtracted therefrom, and therefore the first and second readings have nothing to be compared with. Therefore, these readings are simply used in subsequent calculations.

Exemplary processing may be in accordance with the following instructions:

14. Reset Counter 1
15. Reset Counter 2
16. Reset A REG
17. Reset B REG
18. Load MEM (50 ms Preset) to timer
19. Start timer
20. A/D MPX to INTAKE PRES; Start A/D
21. Skip one if CMPLT
22. Branch to 20
23. Load A/D to B REG
24. Skip one if Time-out
25. Branch to 20
26. Start timer
27. A/D MPX to INTAKE PRES; Start A/D
28. Skip one if CMPLT
29. Load A/D to MEM (Ctr 2)

30. Load A/D to A REG
31. Advance Counter 2
32. Subtract
33. Load RSLT to MEM (Ctr 2)
34. Advance Counter 2
35. Advance Counter 2

Instructions 18–35 put the preset value in the timer so that whenever the timer is started it is preset to this value and with time out when the complement of it has been accumulated with clock counts. Then the timer is started in instruction 19; in the programming shown for the exemplary process herein, the starting of the timer identifies the beginning of the time interval, and at that beginning of the time interval the data is taken and processed. So a first data point is brought in and saved in the B register in instruction 33. The second data point is brought in and stored in memory and placed in the B register in instructions 29 and 30. This second data point is also loaded to memory since it must be subtracted from a subsequent data point once the regular programming begins. Then counter 2 is advanced so as to put the difference between the second and first data points into memory to have them available for comparison with subsequent differences. And then the counter is advanced twice to pass through the addresses where the next previous difference is normally to be stored which normally would be brought out for comparison to see if the present difference is larger than the next previous difference, and the counter is advanced in instruction 35 a second time to pass over the storage location where the second previous value is stored, it being the value for which the two subsequent differences were smaller, and the value of interest which is maintained in that way, as is more apparent in the programming which follows.

In general routine, taking many, many data points as the engine accelerates, the program waits for time out, when it occurs it restarts the timer, samples A/D and stores the new data value in the A register for subtraction from the previous data value to obtain a current difference, and it stores the current data value in memory so that it can be subtracted from the next data value during the next pass through the program. This may be in accordance with the following instructions:

36. Skip one if time out
37. Branch to 36
38. Start timer
39. A/D MPX to INTAKE PRES; Start A/D
40. Skip one if CMPLT
41. Branch to 40
42. Load A/D to MEM (Ctr 2)
43. Load A/D to A REG Then counter 2 is advanced so as to point in memory to the place where the previous data value was stored and it is brought out to the B register and subtracted, the result being put back where the previous data value was stored; in other words, once each data value is subtracted from the next data value, it is no longer needed and the difference between it and the next data value can occupy that place in storage through the next three successive passes. The finding of each difference can be done as follows:

44. Advance Counter 2
45. Load MEM (Ctr 2) to B REG
46. Subtract
47. Load RSLT to MEM (Ctr 2)
48. Load RSLT to A REG Then the counter is advanced once again to point to the place in memory where the next preceding difference is stored to bring it out for comparison with the current difference which has just been made. By subtracting the previous pressure change from the current pressure change, a negative result will indicate that there is a tendency for decrease in the current pressure change compared to the previous one, meaning that maximum slope may have been detected in the previous pressure change. If this had happened twice in a row, then the maximum slope will be the second preceding slope which was detected, that is the second preceding difference between successive data points. So counter 2 is again advanced so that it will provide an address where the second preceding slope is stored, as follows:

49. Advance Counter 2
50. Load MEM (Ctr 2) to B REG
51. Subtract
52. Advance Counter 2

The actual test is made in instructions 53, and if the right relationship in the slope or the difference is not sensed, the program will reset counter 1, because counter 1 is keeping track of whether one slope is less than the preceding slope, and in case one had previously been sensed in that relationship, but the next one in the row is not, then it is thrown out and the comparison must be made two additional times in a row. Then the program goes back to the beginning to pick up the next data point. On the other hand, if a negative result is indicated, this means that the last slope to be taken is smaller than the previous one so that the proper slope relationship exists, and therefore counter 1 should be advanced in instruction 57 to keep track of the fact that one good slope relationship has been found, and then counter 1 is tested to see if it is equal to 2 because if it is that means two in a row have had the right relationship in which case it will branch to the conversion operation finishing up the routine. Otherwise, it will simply go back and pick up the next data point. This is set forth as follows:

53. Skip one if -
54. Branch to 58
55. Reset Counter 1
56. Branch to 36
57. Advance Counter 1
58. Skip one if Counter 2 = 2
59. Branch to 36

Counter 2 has been left set at the address where the second previous slope was located. It was placed at that address so that if the second desired slope relationship in a row had been sensed (that is two slopes each less than the third preceding one) then the third preceding one is the one that is desired and should be read out and used. But if the slope relationships have not yet been sensed, then the third preceding slope is not longer needed, so that storage location is the one used for the next data point to be sensed.

When two proper slopes have been sensed in a row, the third preceding slope is read out for conversion to rate of change of pressure with respect to time. This means the slope itself (the pressure difference taken across the unit of time represented by the interval timer) is an expression of the maximum rate of change of pressure with respect to time. Thus the third preceding slope or difference has to be divided by time to provide this data manifestation. The time is equal to the counts accumulated in the counter divided by the clock which feeds the counts. The counts which accumulate in the counter are of course the complement of the preset counts as described hereinbefore. Thus, if one wanted to, one could achieve the time by loading the interval timer preset (as in instruction 18) to the A register and subtracting so as to provide the complement, moving that to the B register, and then dividing by the frequency of the clock which is feeding the interval timer. However, a simpler way is simply to have a factor available which represents 50 milliseconds, and to divide the maximum pressure slope by this factor, as follows:

60. Load MEM (Ctr 2) to A REG
61. Load 50ms factor to B REG
62. Divide
63. Load RSLT to MEM (where desired)
64. Load RSLT to Print and Display Thus exemplary apparatus for sensing pressure is a function of time until the maximum pressure is sensed has been shown. A second aspect of the present invention is determining the minimum pressure sensed prior to sensing the maximum pressure rate. However, this test need not necessarily be performed, if not desired in utilizing the principle test of the invention which is sensing the maximum rate of pressure rise at the air intake manifold, as an indication of turbocharger health as described hereinbefore.

To modify the program previously described in order to sense the minimum pressure, all that need be done is to check to see if the subtraction of a previous data point from a current data point is negative; normally it is, so that this can be used as a test to skip over recording the minimum value. But if the result is positive and a skip doesn't occur, then a small branch routine can be used to store such a value. If in fact the pressure first decreases and thereafter increases, the last minimum value stored will be the last one prior to the increase.

This feature can be inserted into the previous program during a start-up portion thereof as follows:

32. Subtract
32a. Skip one if -
32b. Branch to 65
33. Load RSLT to MEM (Ctr 2)

And this may be inserted into the program during the normal or running portion of the program as follows:

46. Subtract
46a. Skip one if -
46b. Branch to 67
47. Load RSLT to A REG

In each case a very simple process of storing the minimum value is required; but separate programs are required in order to control branching back to the proper portion of the main program (either instruction 33 or instruction 47 depending on whether the first data points or subsequent data points are being examined):

65. Load MEM (Ctr 2) to MEM (Min Buffer)
66. Branch to 33
67. Load MEM (Min Buffer)
68. Branch to 47

Similarly, reading out of the minimum value at the end of the operation is required so that an additional few program steps may be inserted at the end to cause reading out of the minimum value after the maximum rate has been read out as follows:

69. Skip one if Print Ready
70. Branch to 69
71. Load MEM (Min Buffer) to Print and Display The test of the invention, rate of air intake manifold pressure rise during acceleration, can be practiced in ways other than the way described in the example herein. The rate of pressure rise may be measured across a speed window, or from minimum pressure to a predetermined, higher pressure. The significant aspect is that turbocharger health is indicated without a full mapping procedure, with only one pressure transducer, and without a dynomometer: by providing some indication of rate of change of air intake manifold pressure during a snap acceleration.

It should be understood that the data processing apparatus, and the programming which has been shown herein simply as illustrative of an exemplary process in accordance with the present invention, do not form any part of the invention, and that any suitable programming of suitable processing means may be utilized instead.

Similarly, although the invention has been shown and described with respect to exemplary embodiments thereof, it should be understood by those skilled in the art that the foregoing and various other changes, additions and omissions may be made therein and thereto without departing from the spirit and the scope of the invention.

Having thus described typical embodiments of our invention, that which we claim as new and desire to secure by Letters Patent is:

1. A method of diagnosing the health of a turbocharger on an internal combustion engine during a snap acceleration of the engine while the engine is loaded only by its own inertia, drag, and accessory loads, by determining a rate of increase in intake manifold pressure during the acceleration.

2. A method according to claim 1 including the additional step of determining the minimum pressure sensed as the engine accelerates from low idle to high idle.

3. A method of diagnosing the health of a turbocharger on an internal combustion engine during a snap acceleration of the engine while the engine is loaded only by its own inertia, drag, and accessory loads, by determining a maximum rate of change of intake manifold pressure during the acceleration.

4. A method of diagnosing the health of a turbocharger on an internal combustion engine during a snap acceleration of the engine while the engine is loaded only by its own inertia, drag, and accessory loads, by determining a rate of intake manifold pressure rise with respect to time during the acceleration.

5. In the method of diagnosing the turbocharger of an internal combustion engine, the steps of:
   accelerating the engine from low idle speed to high idle speed while the engine is loaded only by its own inertia, drag, and accessory loads;
   sampling the pressure at the air intake manifold of the engine a substantial number of times during the acceleration of the engine from low idle to high idle; and
   determining from the samples a maximum rate of change of pressure expressed by said samples.

6. A method according to claim 5 wherein the pressure at the air intake manifold is samples in equal time increments.

7. A method according to claim 6 wherein the maximum pressure rise per unit of time is determined by subtracting each pressure reading from a preceding pressure reading and dividing by the sampling time interval.

8. Apparatus for diagnosing the turbocharger of an internal combustion engine without a dynomometer during acceleration of the engine loaded only by its own inertia, drag, and accessory loads, comprising:
- pressure sensing means adapted to be disposed for response to the pressure in the air intake manifold of the engine and providing a pressure signal indicative thereof;
- selectively operable means for sampling said pressure signal and providing a pressure manifestation indicative of the pressure represented thereby; and
- processing apparatus including means for operating said sampling means repetitively to provide a number of said pressure manifestations during a time interval which is commensurate with at least a substantial portion of the time interval for the acceleration of the engine and for determining a rate of increase in air intake manifold pressure indicated by said pressure manifestations.

9. Apparatus according to claim 8 wherein said processing apparatus also includes means for determining the minimum pressure sample represented by said pressure manifestations.

10. Apparatus according to claim 8 wherein said processing apparatus includes means for providing an indication of maximum rate of pressure rise as a function of time.

11. Apparatus according to claim 10 wherein said processing apparatus operates said sampling means in successive equal time intervals and provides said indication of maximum rate of pressure rise by subtraction of successive samples.

* * * * *

UNITED STATES PATENT OFFICE
CERTIFICATE OF CORRECTION

PATENT NO. : 4,046,003
DATED : September 6, 1977
INVENTOR(S) : Lee R. Armstrong, Henry J. Mercik, Jr.

It is certified that error appears in the above-identified patent and that said Letters Patent are hereby corrected as shown below:

| | |
|---|---|
| Column 1, line 61 | "this" should read --thus-- |
| Column 2, line 51 | "or" should read --of-- |
| Column 9, line 37 | After "In" insert --the-- |
| Column 10, line 55 | "not" should read --no-- |
| Column 11, line 57 | after "MEM" insert --(Ctr 2) to MEM-- |
| Column 12, line 60 | "samples" should read --sampled-- |

Signed and Sealed this

Thirteenth Day of June 1978

[SEAL]

Attest:

RUTH C. MASON
Attesting Officer

DONALD W. BANNER
Commissioner of Patents and Trademarks